US008431171B2

(12) United States Patent
Notebaart et al.

(10) Patent No.: US 8,431,171 B2
(45) Date of Patent: Apr. 30, 2013

(54) PARTIALLY NEUTRALIZED ACID COATED FOOD-GRADE PARTICLES

(75) Inventors: Rene Johannes Cornelis Notebaart, Gorinchem (NL); Bas Alphonsus Maria Josephus De Jong, Tilburg (NL); Lambertus Hendricus Elisabeth Roozen, Gilze (NL)

(73) Assignee: Purac Biochem B.V., Gorinchem (NL)

( * ) Notice: Subject to any disclaimer, the term of this patent is extended or adjusted under 35 U.S.C. 154(b) by 123 days.

(21) Appl. No.: 11/822,810

(22) Filed: Jul. 10, 2007

(65) Prior Publication Data

US 2008/0014312 A1    Jan. 17, 2008

Related U.S. Application Data

(60) Provisional application No. 60/830,092, filed on Jul. 12, 2006.

(51) Int. Cl.
*A23L 1/221* (2006.01)

(52) U.S. Cl.
USPC ............ 426/96; 426/302; 426/531; 426/589; 426/590; 426/650; 426/653; 426/660

(58) Field of Classification Search .................... 426/68, 426/98, 96, 302, 531, 589, 590, 650, 653, 426/660
See application file for complete search history.

(56) References Cited

U.S. PATENT DOCUMENTS

| | | | | |
|---|---|---|---|---|
| 3,370,956 | A * | 2/1968 | Reitman et al. ................. | 426/96 |
| 3,734,748 | A * | 5/1973 | Ueno et al. ........................ | 426/9 |
| 3,887,700 | A | 6/1975 | Boncey et al. | |
| 4,278,695 | A | 7/1981 | Velasco | |
| 4,713,251 | A | 12/1987 | Seighman | |
| 4,867,942 | A * | 9/1989 | Gergely et al. ............... | 424/466 |
| 5,415,870 | A * | 5/1995 | Gergely et al. ............... | 424/466 |
| 6,416,799 | B1 | 7/2002 | Porzio et al. | |
| 2003/0144637 | A1* | 7/2003 | Sun et al. ...................... | 604/359 |
| 2004/0115315 | A1 | 6/2004 | Camelot et al. | |
| 2005/0118306 | A1* | 6/2005 | Ludwig et al. ................. | 426/96 |
| 2007/0212446 | A1* | 9/2007 | Jansson et al. .................... | 426/2 |
| 2007/0231455 | A1* | 10/2007 | Bontenbal ..................... | 426/660 |

FOREIGN PATENT DOCUMENTS

| | | |
|---|---|---|
| CA | 2 530 216 A1 | 11/2004 |
| DE | 1 961 922 | 6/1971 |
| EP | 0 286 803 | 10/1988 |
| GB | 1 320 953 | 6/1973 |
| JP | A-63-167759 | 7/1988 |
| JP | A-2002-503957 | 2/2002 |
| JP | A-2006-141256 | 6/2006 |
| JP | A-2007-523904 | 8/2007 |
| WO | WO 98/53705 | 12/1998 |
| WO | WO 02/47489 A1 | 6/2002 |
| WO | WO 2004/012534 A1 | 2/2004 |
| WO | WO 2004/093863 A1 | 11/2004 |
| WO | WO 2004093863 * | 11/2004 |
| WO | WO 2005/077521 A1 | 8/2005 |
| WO | WO 2006/004481 A1 | 1/2006 |

OTHER PUBLICATIONS http://www.fao.org/ag/agn/jecfa-additives/spec/Monograph1/Additive-402.pdf, Sodium Dihydrogen Citrate, 1986, p. 1.*
JP-61-001637—1986—English Abstract—pp. 5-6.*
International Search Report of Application No. PCT/EP2007/057181; mailed Aug. 28, 2007.
Jul. 6, 2011 Chinese Office Action in Chinese Application No. 200780026104.8.
Mar. 9, 2012 Office Action issued in Japanese Patent Application No. 2009-518897 (English Translation Only).

\* cited by examiner

*Primary Examiner* — D. Lawrence Tarazano
*Assistant Examiner* — Hamid R Badr
(74) *Attorney, Agent, or Firm* — Oliff & Berridge, PLC

(57) ABSTRACT

The present invention relates to coated food-grade particles, preferably coated food-grade acids and/or their salts, wherein the particles are coated food-grade cores with coating comprising partially neutralized polycarboxylic acid. The invention further relates to a method for manufacturing said coated food-grade particles and to the use hereof in food applications. The invention also encompasses the use of specific partially neutralized polycarboxylic acids, in particular sodium and/or potassium hydrogen malate, as coating agent. Furthermore, the invention is directed to food and drink products comprising said with partially neutralized polycarboxylic acid coated food-grade particle.

15 Claims, No Drawings

PARTIALLY NEUTRALIZED ACID COATED FOOD-GRADE PARTICLES

The present invention relates to coated food-grade particles, in particular a coated food-grade acid and/or salt thereof, wherein the particles are coated with partially neutralized polycarboxylic acid. The present invention is also directed to the use of said partially neutralized polycarboxylic acid as coating agent. The invention further relates to a method for manufacturing above-mentioned coated particles and to a food or drink product comprising the food-grade particles coated with partially neutralized polycarboxylic acid.

Food-grade acids are coated or encapsulated for various reasons. Most often encapsulated or coated acids are used for controlled release of the acid in a food application. The acid is then released due to a controllable event, as for example the contacting of the coating or encapsulation layer with water, application of heat, or by a change of pH.

Further, the coating or encapsulation layer is used to protect the acid from the environment. Hygroscopic acids, for example, tend to become sticky during storage and often a loss in taste and texture is observed. The acids loose their functionality and as a consequence the food products comprising these acids are negatively influenced in taste and/or texture. Application of a coating or encapsulation layer around the acids solves this problem and extends the shelf life of the acids and of the food products comprising said coated acids.

Dependent on the food and/or drink application and/or on the mechanisms used for controlled release of the acid, different coatings or encapsulation layers are possible. It is well known that food applications that are subjected to a heat treatment comprise a food-grade acid that is often coated with a fat or an oil composition. Food applications that come in contact with water require a (partly) water-soluble coating such as e.g. glycerides or hydrogenated oils. Some coatings require a change in pH for release of the coated or encapsulated acid. Other well-known encapsulation or coating materials may comprise wax, carbohydrates, proteins, polymers, and/or mixtures hereof as is described in WO 2004/012534. WO 2004/012534 and its US counterpart US2004/115315) are directed to the encapsulation of crystalline lactic acid with said materials.

U.S. Pat. No. 4,713,251 describes an extrusion process for the encapsulation of liquid acids such as phosphoric acid. Hereto, water-soluble film-forming or matrix-forming agents are applied. Described are agents such as non-protein base materials (e.g. modified starches), natural gums, water-soluble cellulose compounds, polysaccharides, proteins (casein, gelatin, gluten) and synthetic film-forming agents such as polyvinyl alcohol, polyvinyl pyrrolidone or carboxylated styrene. These agents may be mixed with highly water-soluble salts such as alkali metal or calcium salts of phosphoric acid, citric acid, tartaric acid, carbonic acid or hydrates thereof, in order to obtain a certain fused or glassy hard appearance or texture of the final product. The salts and matrix-forming ingredients are mixed with the acid to be encapsulated after which the mixture is extruded. This results in a matrix of e.g. starch in which the acid and the above-mentioned salt are dispersed.

U.S. Pat. No. 6,416,799 is directed to the formation of an encapsulation composition in which encapsulate such as e.g. a flavoring agent is encapsulated in a matrix which is stable in the glassy state at ambient temperatures. Hereto, in U.S. Pat. No. 6,416,799 a glassy matrix is used comprising a major amount of a maltodextrin. By using a buffering system in the maltodextrin matrix, a matrix is obtained that is stable in the glassy state at ambient temperatures and that is further suitable for the encapsulation of a pH-sensitive flavor component. Described is a matrix comprising 80-95 wt % of maltodextrin, 1-15 wt % of a salt of an organic acid, and 0-15 wt % of an organic acid, the latter two forming said buffering system for pH-sensitive flavor components. As suitable salts of organic acids also salts are mentioned in which one or more of the acidic protons are replaced with a cation such as sodium, potassium, calcium, magnesium, and ammonium such as e.g. a mono-sodium acid salt.

The encapsulation is carried out via an extrusion process and the final product is a flavoring agent encapsulated via extrusion by a matrix of maltodextrin with small amounts of a salt of an organic acid and/or an organic acid.

In above-mentioned state of the art, chemically complex and often expensive materials are used as coating or encapsulation agents (e.g. glycerides and hydrogenated oils).

It is known that many of the commonly used coating agents negatively influence taste, texture, and/or appearance of the food products comprising these coating agents. Sometimes this is due to a direct effect of the coating agent on the coated ingredient and/or sometimes it is due to an effect of the coating agents on other components present in the food product.

Many of the coating agents used are, for example, instable with respect to hygroscopicity as e.g. starches and carbohydrates, thereby altering taste, texture, and also appearance of the coated product and/or the food product comprising said coated product during storage. Most often, the coating agents affect the functionality of the coated product and/or due to the coating agents the concentration of the coated ingredient that can be applied is minimized. Further, some of the coating agents, as e.g. fats, require a complex mechanism to release the encapsulated ingredient and/or require a significant amount of time before a release of the functional ingredient is indeed achieved.

The present invention provides a solution to overcome above-mentioned disadvantages. The present invention pertains to the use of chemically simple and stable coating agents with several functionalities, which further do not negatively influence the encapsulated or coated ingredient and extend the shelf life of said ingredients. The invention further relates to food products with increased shelf lives without degradation of taste, texture, and/or appearance. Furthermore, the present invention is directed to food products with an instant and prolonged acid taste sensation during digestion.

Another advantage provided by the present invention is that the content of the coated functional ingredient such as e.g. acid can be very high as the coating can be applied directly on the acid. No auxiliary materials are required in contrast to, for example, encapsulation of the active ingredient in a matrix via extrusion for which a matrix-forming agent is required.

The invention further is related to a simple and reliable manufacturing process.

Hereto, the invention is directed to a food-grade particle comprising a core and a coating wherein the coating comprises at least one layer, each of which layers being made of a composition comprising at least 50 wt % (weight-based) of a partially neutralized polycarboxylic acid. Preferably, said partially neutralized polycarboxylic acid is in a weight-based concentration of 70 wt % or higher, based on total coating composition.

The above-mentioned prior art extrusion processes yield particles in which the active ingredient is surrounded by the matrix-forming agent and/or other additional ingredients or agents. Said processes do not yield coated particles comprising a core-coating configuration (also called "core-shell structure") wherein the core comprises the active ingredient and the coating forms a shell. The particles of the present invention do have this core-coating configuration. The purpose of the core-coating configuration is to create different functionalities within one particle and to give the particle different physical properties, in terms of e.g. appearance, texture, density, flowability, dissolution rate etcetera, making it very suitable for various applications and in handling and storage of said particles. It goes without saying that core and coating are different in either composition in terms of type of components present or in concentrations of the components present and/or different in physical properties in terms of for example texture or density.

The core of the food-grade particle of the present invention comprises a single particle, which can be amorphous or crystalline, and/or an agglomerate of several particles. Said particle thus may have various forms ranging from a round shaped particle to a randomly shaped particle.

The coating or encapsulation layer involves a layer or shell around the core wherein the layer can have a varying thickness. The coating layer further may consist of several layers. The encapsulation or coating layer may be entirely or partially closed depending on the application for which it is used.

The coating layer is minimally 20 wt % (weight-based) of the total particle and preferably about or between 40 to 80 wt %. Particularly a coating of about 50-70 wt % and most preferably 65-70 wt % of the total particle is applied.

The particles can have various forms with various sizes. Dependent on the food application, the mean particle size, also referred to as the D50-value of a particle size distribution as the person skilled in the art knows, will be kept in a lower range up to for example 300 micrometer or in a higher range of or between for example 500-1000 micrometer, more preferably 500-750 micrometer. For the majority of food applications a mean particle size of 200-500 micrometer was found to be very suitable.

The expression "partially neutralized polycarboxylic acid" according to the invention means an acid with at least one carboxylic group in the acid form and at least one carboxylic group in the salt form. Said carboxylic group in the salt form is a neutralized carboxylic acid group. An example thereof is mono-sodium hydrogen malate. The partially neutralized polycarboxylic acid can also be an acid with more than two carboxylic groups of which one or more of said carboxylic groups are neutralized. Example are mono-sodium dihydrogen citrate having one neutralized carboxylic group and two carboxylic groups in the acid form, and di-sodium hydrogen citrate comprising two neutralized carboxylic groups and one acid group.

Such a partially neutralized polycarboxylic acid has several functionalities: the acid group(s) provides a sour taste on the one hand and on the other hand the neutralized acid group(s) for example stabilize the acid in terms of a reduced hygroscopicity.

It was found that said partially neutralized polycarboxylic acid can be very well used for coating purposes. The result is a food-grade particle comprising a core and a coating wherein the coating is multifunctional: the coating introduces a sour taste in the particle and has an increased stability due to the presence of said partially neutralized acid and further acts as a coating, thus protecting the core and thereby providing a coated food-grade particle with an increased stability and shelf life.

U.S. Pat. No. 3,370,956 describes the coating of fumaric acid crystals with hydroxy carboxylic acid and/or metals salts hereof such as the potassium and sodium salts. No further examples are given of said salts. The patent does not describe or suggest the possibility of using specifically partially neutralized polycarboxylic acids.

Canadian patent CA2530216 describes the use of such partially neutralized polycarboxylic acids such as sodium hydrogen malate, potassium dihydrogen citrate and others for various purposes including application in food and drink products. In the various applications described said partially neutralized acids are used as active ingredient and not as coating agent. The Canadian patent does neither disclose nor suggest that such partially neutralized acids are very suitable for application as coating agent. This patent does further not disclose the advantages as described above for protecting the ingredient to be coated or encapsulated from environmental influences and thereby increasing the shelf-life of said ingredient without negatively affecting the ingredient or the food or drink product in which it is to be applied, by introducing various taste sensations or by prolonging the sourness sensation, etcetera.

In the coated particles of the present invention, preferably a coating comprising a partially neutralized polycarboxylic acid is used wherein said acid is selected from malic acid, citric acid, fumaric acid, adipic acid, tartaric acid, and/or mixtures hereof. A coating comprising mono-sodium or mono-potassium hydrogen malate, mono-sodium or mono-potassium dihydrogen citrate, or di-sodium or di-potassium hydrogen citrate are found to provide both a very stable coating with a very nice acidic taste sensation; most preferred is a coating comprising sodium or potassium hydrogen malate.

The coating according to the present invention may also comprise combinations of various partially neutralized polycarboxylic acids as for example a mixture of mono-sodium hydrogen malate with di-sodium hydrogen citrate. All combinations of above-mentioned partially neutralized polycarboxylic acids are possible. Said combinations may be applied in one coating layer or in several coating layers leading to, for example, a particle with an outer coating layer comprising mono-sodium hydrogen malate on top of an inner coating layer of mono-sodium citrate that partially or completely surrounds the food grade core.

The core of the particles of the present invention may comprise one or more functional ingredients as e.g. flavoring agents, preservatives, anti-microbial, antibacterial agents, and/or food fortification agents.

The core of the coated particles of the present invention may have different forms: it may for example be a mixture of particles, it may be an extruded or a partially or completely coated or multi-layered particle, etcetera.

The core comprises food-grade acids and/or partially or completely neutralized salts of food-grade organic acids such as e.g. sodium lactate, potassium lactate, mono-sodium hydrogen malate, and di-sodium malate. The core may have a different composition than the coating in terms of components present and concentrations of the components present.

A core comprising a food-grade acid was found to be very suitable for coating with the partially neutralized polycarboxylic acid according to the invention. It is well-known that most food-grade acids are very instable in terms of hygroscopicity. The obtained coated acid particle of the present invention has been found to be very stable resulting in an extended shelf life of the coated acid particles without significant changes in taste, texture, and/or appearance of the coated particles. Further, said coated acid particles have an instant and relatively easy mechanism for acid release by means of contact with moisture such as e.g. saliva, optionally accompanied with a change in pH. The coated acid according to the invention releases its acid in a few seconds due to the instant dissolving of the partially neutralized polycarboxylic acid in the coating, in contrast to the dissolving of a coating layer comprising fat which takes significantly longer as known in the art.

The coated acid particle according to the invention is further found to provide a prolonged and undiluted acid taste sensation due to firstly the partially acidic coating layer that dissolves and secondly the release of the acid in the acid-comprising core. This makes the coated acid particles very suitable for applications such as e.g. confectionery products in which such a strong and long-lasting acidic taste profile is desired.

The food-grade acid to be coated, or the core, can comprise an inorganic or organic acid particle. Due to their characteristic and desired acid profile, preferably organic acids are used such as malic acid, lactic acid, acetic acid, citric acid, fumaric acid, adipic acid, tartaric acid, and/or combinations thereof. These acids may be used for the composition of the core or, except for lactic acid and acetic acid, as the partially neutralized polycarboxylic acid in the coating composition as long as the coating and core are different in either composition and/or physical properties in such a way that a particle with a core-coating configuration is obtained. An example of a particle of the present invention is a particle having a coating of sodium hydrogen malate and a core of sodium hydrogen malate and malic acid.

The acid in the core and the acid that is used as partially neutralized polycarboxylic acid in the coating are not necessarily the same. By combining acids with a different acid taste profile, a particle can be made with an acid taste sensation that is changing during digestion. Very nice results were obtained with both lactic acid and malic acid coatings with mono-sodium or mono-potassium hydrogen malate cores. The core may also comprise a combination of lactic acid and malic acid, and/or salts hereof.

Said particles with a varying and long-lasting acidic taste sensation were found to be very suitable for application in e.g. confectionery products. All combinations of above-mentioned food-grade acids as core and/or as coating are possible.

Further, especially lactic acid crystals are known to be very hygroscopic. Coating the crystals with fat, as is the state of art at the moment, solves this specific problem but leads to other issues with respect to, for example, a negative impact on taste and even on food safety aspects due to the fat becoming rancid. Anti-degradation agents have to be added for prevention of the deterioration of the fat quality. Coating the lactic acid-comprising cores with a solution comprising mono-sodium or mono-potassium hydrogen malate stabilizes the hygroscopic lactic acid cores and avoids the use of fat. Particles with a lactic acid-comprising core and a coating comprising mono-sodium or mono-potassium hydrogen malate were found to have a significantly increased shelf life with respect to taste, appearance and texture of the coated particles. Food products comprising above-mentioned malate coated lactic acid particles were also found to have an increased shelf life. The same results were found for particles with a core comprising a salt of lactic acid, as e.g. sodium lactate or potassium lactate, or a mixture of lactic acid and a salt thereof in combination with a coating composition comprising mono-sodium or mono-potassium hydrogen malate, and for food products comprising these particles. A further example and preferred embodiment of the present invention comprises particles comprising a coating of sodium or potassium hydrogen malate and a core comprising a mixture of malic acid and sodium or potassium hydrogen malate. The core may comprise up to about 60 wt % malic acid. Preferably, the core comprises from 5 to 55 wt % malic acid and 90 to 45 wt % sodium or potassium hydrogen malate; even more preferably the core comprises 30 to 54 wt % malic acid and 70 to 46 wt % sodium or potassium hydrogen malate. It was found that these particles were most enjoyed because of the immediate and long-lasting sour taste sensation. The particles further appeared to be very stable in appearance and taste and showed an extended shelf-life.

The coated acid particles of the present invention are very suitable for use in various food and drink applications. Food and drink products comprising a coated acid particle according to the invention are found to be very stable with an increased shelf life, a constant appearance and no significant losses or changes in taste and texture of the products.

Examples of food and/or drink products are soups and sauces, dressings, spice-blends, bakery products, (powdered) beverages, and in particular all kinds of (powdered) confectionery products like sugar- or acid-sanded or -coated hard and/or soft candies, chewing gum and lolly-pops.

The coated acid particle of the present invention can particularly be used for sugar and/or acid-sanding, coating or panning of confectionery products. The invention increases the shelf life of said confectionery products significantly. Confectionery products like candies and/or the food-grade acids used in confectionery products are usually coated with small layers of fat. A partially neutralized polycarboxylic acid as coating dissolves much quicker compared to a coating of fat resulting in a more instant sour taste sensation at bringing the candy into the mouth. Further, the presence of fat is sometimes undesirable from a health point of view or due to a negative effect on taste.

The present invention results in hard and soft candies, including lolly-pops and chewing gum, with a strong and prolonged sour taste sensation due to the release of the coated acid and the release of the partially neutralized acid coating.

Hard candies with a coating or a sanding layer comprising coated acid particles according to the present invention do not become sticky during storage since the uptake of moisture is prevented. Soft candies, especially gelatin or starch-based soft candies with a coating or a sanding layer comprising the coated acid particles according to the invention show significant less uptake of moisture during storage and further show less acid migration into the soft candies thereby minimizing the loss in the instant acid taste sensation at bringing the candy into the mouth. Especially good results have been found with particles with a core comprising malic acid or lactic acid or a mixture thereof in combination with a coating composition comprising mono-sodium hydrogen malate or mono-potassium hydrogen malate for sanding, panning or coating of confectionery products as hard and soft candies, including chewing gum. Further, above-mentioned particles may also have a core comprising malic acid or lactic acid in combination with salts of lactic acid and/or malic acid as for example a core comprising lactic acid and calcium lactate or a core comprising lactic acid and mono-sodium hydrogen malate or malic acid with a lactate or malate salt. All combinations are possible.

Depending on the counter ion used for neutralization of the carboxylic end group(s) of the polycarboxylic acid in the coating composition, the coated food-grade particle according to the invention may also be used for food fortification purposes such as e.g. calcium enrichment.

The present invention further relates to a method for the preparation of the food-grade particles according to the present invention wherein a food-grade core is coated by bringing the core in contact with a solution comprising partially neutralized polycarboxylic acid. Said contacting can take place via e.g. spraying or sprinkling the partially neutralized polycarboxylic acid-comprising solution on the food-grade cores until a partial or complete closing coating layer of desired thickness is obtained. The cores may also be submerged or dipped in a solution comprising partially neutralized polycarboxylic acid, after which the particles are separated again from said solution.

The process may be performed batch-wise or continuous. It may take place in a fluid bed dryer, spray dryer, spray granulator, or similar piece of equipment well-known to the person skilled in the art, wherein the cores are fluidized or by other means mixed while being contacted e.g. sprayed with or dipped in the partially neutralized polycarboxylic acid-comprising solution. The coated particles are left to dry, or alternatively may be dried actively, simultaneously, or subsequently by any drying means well-known to the person skilled in the art. The particles may optionally be again subjected to a spraying or dipping process in order to obtain several coating layers optionally comprising various separate or combinations of partially neutralized polycarboxylic acids. Particle sizes vary between 50 and 1000 micrometer. Preferably, particles are made of a mean particle size (D50) of between 200 and 500 micrometer, since this particle size is suitable for the majority of food applications and can be very well made with the method for preparation according to the present invention.

Above-described method was found to be very suitable for the preparation of food-grade particles with a coating comprising mono-sodium or mono-potassium hydrogen malate and a core comprising malic acid and/or a malate salt, or a core comprising lactic acid and/or a lactate salt, or a core comprising any combination of lactic acid, malic acid and/or a salt thereof.

Further, the method was also applied with success for the preparation of (multilayered) mono-sodium hydrogen malate wherein a core comprising mono-sodium hydrogen malate is coated once or several times with a solution comprising mono-sodium hydrogen malate. Said core comprising mono-sodium hydrogen malate may be obtained via commercially available mono-sodium hydrogen malate or may be made via reaction of malic acid with sodium hydroxide followed by crystallization of mono-sodium hydrogen malate. Crystallization is the commonly-applied method for the synthesis of mono-sodium hydrogen malate. An advantage of the method according to the invention is that there is no mother liquor that needs further processing, which further renders a higher yield since removal of the mother liquor always includes removal of an amount of sodium hydrogen malate which is contained therein. Further, the method according to the present invention can be very efficiently controlled and thus the particle size can be controlled. Crystallization is not controllable and leads to randomly sized and shaped particles. Further, crystallization requires an additional drying step which has to be carried out in an additional piece of equipment. The present process can be conducted in one apparatus and does not require additional expensive processing steps.

The sodium hydrogen malate particles obtained via the method according to the invention have a core-coating configuration and consequently have a different appearance and different physical properties compared to the sodium hydrogen malate made via crystallization. The sodium hydrogen particles of the present invention are nicely shaped and have a controlled particle size, which makes these particles more suitable for applications wherein the appearance of the sodium hydrogen malate particles is important, such as e.g. in the acid-sanding of candies. Further, the sodium hydrogen particles of the present invention demonstrate a better flowability and are less dusty and sticky which makes them very easy to handle and process. Furthermore, the sodium hydrogen malate particles of the invention dissolve quicker. This is not only advantageous as less time is needed to introduce the particles into a certain application, they also dissolve faster in the mouth and thus the characteristic taste of sodium hydrogen malate is sensed almost directly.

The same method may be used for the manufacture of particles with a core of potassium hydrogen malate and a coating of potassium hydrogen malate or a core of potassium hydrogen malate with a coating of sodium hydrogen malate or vice versa.

The following non-limiting examples further illustrate the invention.

EXAMPLE I

Method for preparation of coated acid particles with a coating comprising a partially neutralized polycarboxylic acid.

A solution of mono-sodium hydrogen malate was made as follows:

A solution of malic acid (ca. 5.3 kg) and demi-water (ca. 10.0 kg) was prepared in a double-wall vessel with stirrer (about 60 liters). The temperature of the solution was 30-35° C. About 50% wt % of sodium hydroxide (ca. 3.2 kg) was added to the malic acid solution. The temperature of the solution was increased up to 70-80° C. due to the exothermic reaction. The solution was clear and slightly yellow. The temperature of the solution was kept at about 80° C. to prevent crystallization in the vessel. The final concentration of the solution was 33.6 wt % mono-sodium hydrogen malate.

The mono-sodium hydrogen malate solution was pumped using a tube pump into the fluid bed spray nozzle of the GPC-3 pilot GLATT®, which is a commercially available fluid bed dryer system. The tube pump has an average speed of 35-40 g/min.

The basket of the pilot GLATT® fluid bed dryer was filled with 1.0 kg of malic acid and 1.0 kg of sodium mono malate. The starting material was heated up to 60° C. during fluidization of the product. Airflow speed was set at 100 m³/h. Spraying mono-sodium hydrogen malate was started at reaching 60° C. After a few minutes the airflow was set at about 130 m³/h. Air inlet temperature was set at 95° C. An average spray rate was used of 35 g/min and the spray pressure was 3 bar. Spraying mono-sodium hydrogen malate was stopped after 60 minutes. The product was cooled to 30° C. for about 45 minutes. The product was collected in plastic bags.

SEM pictures demonstrates that the resulting product is a mixture of malic acid particles coated with mono-sodium hydrogen malate, mono-sodium hydrogen malate particles coated with mono-sodium hydrogen malate, and agglomerates of malic acid and mono-sodium hydrogen malate coated with mono-sodium hydrogen malate.

Table 1 shows the results of a DVS analysis made of this final product. Table 1 further shows the DVS isotherms of various other coated or non-coated well known food-grade acids as citric acid monohydrate (originating from Merck® (4007)), DL-malic acid 99% (from Acroso (4016)), Coated citric acid 95% (Bartek® (S-153)) and Coated malic acid 95%, (Bartek® (S-121), coated with partially hydrogenated vegetable oil).

TABLE 1

DVS (Dynamic Vapor Sorption) isotherms
(R.H. is relative humidity).

Change in Mass (%)
during sorption (ref. to dry mass at 25° C.)

| R.H. (%) | Final product | Citric acid | Malic acid | Coated citric acid | Coated malic acid |
|---|---|---|---|---|---|
| 0 | 0.00 | 0.0 | 0.0 | 0.0 | 0.0 |
| 60 | 0.39 | 0.0 | 0.1 | −0.1 | 0.1 |
| 70 | 1.93 | 0.0 | 0.1 | −0.1 | 0.1 |
| 80 | 7.56 | 20.4 | 1.4 | 43.3 | 0.5 |
| 90 | 29.84 | 72.2 | 81.5 | 86.9 | 60.3 |

Above Table 1 shows a significantly reduced absorption behavior of the coated final product according to the invention compared to food-grade acids as citric acid and malic acid that have been coated with the usual coating materials comprising partially hydrogenated vegetable oil.

EXAMPLE 2

The migration of acids into soft-candies is qualitatively mimicked by measurement of the migration of acids in time in a gelatin-based gel on which an acid-sanding is sprinkled.

Gels were made by solving 84 gram of gelatin (250 bloom) in 156 gram water in a water bath at 80° C. A mixture of 342 gram of sugar and 512.4 gram of glucose syrup 42DE was added to 105.6 gram of water and mixed in a pan on a hot plate at 116° C. After mixing, the mixture was left to cool down to 80° C. Said mixture was added to the gelatin solution and after mixing 0.6 gram of methyl red indicator was added and mixing was continued.

About 50 gram of the resulting mixture was put in a glass tube (Ø 3 cm), after which the tube was sealed off with a cap and the mixture was left to dry for 1 day at room temperature.

After one day 0.4 gram of an acid-sanding mixture was sprinkled on top of the gels. Acid-sanding mixtures of the following compositions were used:
1. Final product (made via the experimental method as described in the previous example)
2. Encapsulated malic acid 95% from Balchem® (S-121), coating consists of partially hydrogenated palm oil
3. Encapsulated citric acid 95% from Balchem® (S-167)

After sprinkling the acid-sanding compositions on top of the gels, the tubes were closed with rubber caps. The acid-sanded gels were stored at 35° C./70% R.H. (Relative Humidity).

The acid migration was followed by visual observation of the change in color of the methyl red indicator present in the gels from yellow (at high pH) into red (at low pH). Said migration was followed during a couple of days of storage of the gels at different storage conditions and the results are shown in the following Table 2.

TABLE 2

Acid migration (mm) in gelatin gels
(Aw (water activity at 20° C.) of the gel is
0.69, storage conditions 35° C./70% (R.H.))

| Migration in mm | Time in days | | | | | |
|---|---|---|---|---|---|---|
| Acid-sanding comp. | 0 | 4 | 9 | 15 | 18 | 29 |
| Final product | 0 | 0 | 0 | 0 | 0 | 0 |
| Encaps. Malic acid | 0 | 0 | 0.5 | 1 | 2 | 2 |
| Encaps. Citric acid | 0 | 0 | 0.5 | 0.5 | 1 | 1 |

Table 2 shows that the final product according to the invention is more stable with respect to acid migration compared to well-known and often used food-grade acids such as encapsulated malic acid and encapsulated citric acid.

The invention claimed is:

1. A food-grade particle comprising a core and a coating, wherein the coating comprises at least one layer, the at least one layer being made of a coating composition comprising at least 50 wt % of a partially neutralized polycarboxylic acid,
wherein the partially neutralized polycarboxylic acid comprises at least one carboxylic group in an acid form and at least one carboxylic group in a salt form, and
wherein the core comprises at least one food-grade acid, the food grade acid is at least one of lactic acid, malic acid, and salts thereof.

2. The food-grade particle of claim 1, wherein the core and the coating have a different composition.

3. The food-grade particle of claim 1, wherein the coating comprises a mixture of partially neutralized polycarboxylic acids.

4. The food-grade particle of claim 1, wherein the partially neutralized polycarboxylic acid is based on an acid selected from the group consisting of malic acid, citric acid, fumaric acid, adipic acid, tartaric acid, and mixtures thereof.

5. The food-grade particle of claim 1, wherein the partially neutralized polycarboxylic acid is selected from the group consisting of mono-sodium hydrogen malate, mono-potassium hydrogen malate, mono-sodium dihydrogen citrate, mono-potassium dihydrogen citrate, di-sodium hydrogen citrate, di-potassium hydrogen citrate, and mixtures thereof.

6. The food-grade particle of claim 1, wherein the coating composition comprises mono-sodium hydrogen malate or mono-potassium hydrogen malate, and the core comprises lactic acid and/or a salt thereof.

7. The food-grade particle of claim 1, wherein the coating composition comprises mono-sodium hydrogen malate or mono-potassium hydrogen malate, and the core comprises malic acid and/or a salt thereof.

8. A food or drink product comprising the food-grade particle of claim 1.

9. The food or drink product of claim 8, wherein the food or drink product is selected from the group consisting of soups, sauces, dressings, spice-blends, bakery products, beverages, and confectionery products.

10. A method for the preparation of the food-grade particle of claim 1, the method comprising coating a food-grade core by bringing the core in contact with a solution comprising a partially neutralized polycarboxylic acid.

11. The method according to claim 10, wherein the coating is conducted by spraying or sprinkling the solution upon the core.

12. The method according to claim 10, wherein the food-grade core comprises mono-sodium hydrogen malate and the solution comprises mono-sodium hydrogen malate.

13. The sodium hydrogen malate particle obtained by the method according to claim 12.

14. A method for coating a food grade core, comprising:
contacting the core with a coating agent comprising at least 50 wt % of a partially neutralized polycarboxylic acid, wherein the partially neutralized polycarboxylic acid is based on an acid selected from the group consisting of malic acid, citric acid, fumaric acid, adipic acid, tartaric acid, and mixtures thereof.

15. The method according to claim 14, wherein the partially neutralized polycarboxylic acid is selected from the group consisting of sodium hydrogen malate, and potassium hydrogen malate.

\* \* \* \* \*